United States Patent
Bailey et al.

(10) Patent No.: US 12,325,409 B2
(45) Date of Patent: Jun. 10, 2025

(54) MAP-BASED BRAKING

(71) Applicant: Nissan North America, Inc., Franklin, TN (US)

(72) Inventors: Mark Bailey, Seattle, WA (US); Erik St. Gray, Tacoma, WA (US); Kevin Kochever, San Bruno, CA (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 231 days.

(21) Appl. No.: 18/145,706

(22) Filed: Dec. 22, 2022

(65) Prior Publication Data

US 2024/0208481 A1    Jun. 27, 2024

(51) Int. Cl.
*B60W 10/18*     (2012.01)
*B60W 30/18*     (2012.01)
*B60W 40/072*    (2012.01)
*B60W 40/101*    (2012.01)
(Continued)

(52) U.S. Cl.
CPC ...... *B60W 10/18* (2013.01); *B60W 30/18145* (2013.01); *B60W 40/072* (2013.01); *B60W 40/101* (2013.01); *B60W 40/105* (2013.01); *B60W 50/0097* (2013.01); *B60W 2520/26* (2013.01); *B60W 2530/20* (2013.01); *B60W 2552/30* (2020.02); *B60W 2555/40* (2020.02); *B60W 2556/40* (2020.02); *B60W 2556/50* (2020.02); *B60W 2710/18* (2013.01); *B60W 2720/10* (2013.01)

(58) Field of Classification Search
None
See application file for complete search history.

(56) References Cited

U.S. PATENT DOCUMENTS

| | | | |
|---|---|---|---|
| 5,315,295 A * | 5/1994 | Fujii | G01C 21/26 340/936 |
| 7,400,963 B2 * | 7/2008 | Lee | B60W 10/184 701/72 |

(Continued)

FOREIGN PATENT DOCUMENTS

| | | | | |
|---|---|---|---|---|
| CN | 106564507 A | * | 4/2017 | ............ B60W 30/04 |
| CN | 109415062 A | * | 3/2019 | ........... B60R 16/037 |

(Continued)

*Primary Examiner* — Kevin R Steckbauer
(74) *Attorney, Agent, or Firm* — Young Basile Hanlon & MacFarlane, P.C.

(57) ABSTRACT

Vehicle control using map-based braking includes receiving, while a driver is operating the vehicle to traverse a vehicle transportation network, vehicle operation information including at least a current speed of the vehicle, retrieving, from a planned path of an in-vehicle navigation system, an upcoming turn in a current road when the driver is using the in-vehicle navigation system, and retrieving from map data, the upcoming turn in the current road when the driver is not using tin-vehicle navigation system. Thereafter, it is determined whether, during the upcoming turn, wheels of the vehicle will maintain contact with a road surface at the current speed. A braking instruction is issued to a control system of the vehicle responsive to whether the wheels of the vehicle will maintain contact with the road surface at the current speed.

20 Claims, 5 Drawing Sheets

(51) Int. Cl.
  *B60W 40/105*   (2012.01)
  *B60W 50/00*    (2006.01)

(56) References Cited

U.S. PATENT DOCUMENTS

| | | | | |
|---|---|---|---|---|
| 7,774,121 | B2* | 8/2010 | Lee | B60W 30/143 |
| | | | | 701/93 |
| 8,265,847 | B2* | 9/2012 | Miyajima | B60K 31/0066 |
| | | | | 701/72 |
| 9,043,104 | B2* | 5/2015 | Kiefer | F16H 61/0213 |
| | | | | 701/65 |
| 9,187,097 | B2* | 11/2015 | Levin | B60W 50/14 |
| 9,796,382 | B2* | 10/2017 | Sekine | G01C 21/26 |
| 10,029,698 | B2* | 7/2018 | Rao | G05B 13/024 |
| 10,099,689 | B2* | 10/2018 | Wada | B60W 30/12 |
| 10,852,746 | B2* | 12/2020 | Silver | G05D 1/0214 |
| 2002/0161510 | A1* | 10/2002 | Matsuura | G01C 21/28 |
| | | | | 701/41 |
| 2007/0150157 | A1* | 6/2007 | Lee | B60K 31/0083 |
| | | | | 701/93 |
| 2012/0310499 | A1* | 12/2012 | Kiefer | F16H 61/0213 |
| | | | | 701/65 |
| 2012/0326856 | A1* | 12/2012 | Levin | B60W 50/14 |
| | | | | 701/1 |
| 2017/0015316 | A1* | 1/2017 | Sekine | B60W 10/20 |
| 2018/0022361 | A1* | 1/2018 | Rao | B60R 16/037 |
| | | | | 701/23 |
| 2019/0354101 | A1* | 11/2019 | Sujan | G08G 1/22 |
| 2020/0192403 | A1* | 6/2020 | Silver | B60W 10/18 |
| 2021/0132628 | A1* | 5/2021 | Silver | B60W 10/04 |
| 2023/0294692 | A1* | 9/2023 | Ueyama | B60W 40/072 |
| | | | | 701/93 |
| 2023/0294697 | A1* | 9/2023 | Ashizawa | B60W 30/143 |
| | | | | 701/93 |
| 2023/0315122 | A1* | 10/2023 | Silver | G01S 13/956 |
| | | | | 701/23 |
| 2024/0208481 | A1* | 6/2024 | Bailey | B60W 30/18145 |

FOREIGN PATENT DOCUMENTS

| | | | | |
|---|---|---|---|---|
| CN | 111976725 | A * | 11/2020 | |
| CN | 115042816 | A * | 9/2022 | B60W 10/20 |
| CN | 117341676 | A * | 1/2024 | |
| CN | 115042816 | B * | 6/2024 | B60W 10/20 |
| DE | 4201142 | A * | 8/1992 | B60K 31/0058 |

* cited by examiner

MAP-BASED BRAKING

TECHNICAL FIELD

This disclosure relates generally to vehicle control and driving, and more particularly to using map-based braking in the control of a vehicle.

BACKGROUND

A vehicle may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action of semi-autonomous or assisted driving in response to the captured data.

SUMMARY

Disclosed herein are aspects, features, elements, implementations, and embodiments of controlling a vehicle that uses map-based braking.

An aspect of the disclosed embodiments is an apparatus for vehicle control that includes a processor. The processor is configured to receive, while a driver is operating the vehicle to traverse a vehicle transportation network, vehicle operation information including at least a current speed of the vehicle, retrieve, from a planned path of an in-vehicle navigation system, an upcoming turn in a current road when the driver is using the in-vehicle navigation system, retrieve, from map data, the upcoming turn in the current road when the driver is not using the in-vehicle navigation system, determine whether, during the upcoming turn, wheels of the vehicle will maintain contact with a road surface at the current speed, and issue a braking instruction to a control system of the vehicle responsive to whether the wheels of the vehicle will maintain contact with the road surface at the current speed.

Another aspect of the disclosed embodiments is a vehicle implementing vehicle control. The vehicle includes an in-vehicle navigation system, a control system for braking the vehicle, and a processor. The processor is configured to receive, while a driver is operating the vehicle to traverse a vehicle transportation network, vehicle operation information including at least a current speed of the vehicle, determine whether the driver is using the in-vehicle navigation system, retrieve, from a planned path of the in-vehicle navigation system, an upcoming turn in a current road when the driver is using the in-vehicle navigation system, retrieve, from map data, the upcoming turn in the current road when the driver is not using the in-vehicle navigation system, determine whether, during the upcoming turn, wheels of the vehicle will maintain contact with a road surface at the current speed, and issue a braking instruction to the control system responsive to whether the wheels of the vehicle will maintain contact with the road surface at the current speed.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects disclosed herein will become more apparent by referring to the examples provided in the following description and drawings in which like reference numbers refer to like elements.

DETAILED DESCRIPTION

A vehicle may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof. An autonomous vehicle (AV) may use these inputs to select waypoints for control of the vehicle, along with actions to be taken at each waypoint. A semi-autonomous vehicle may use these inputs for one or more advanced-driver assistance systems (ADAS).

When a driver operates a vehicle (e.g., an AV operated in a non-autonomous mode or a semi-autonomous vehicle), predictive braking may be performed when an object is detected in the path of the vehicle. This object detection-based braking can be less than optimal, such as when tight corners exist and braking distance is minimal. Improved vehicle control may be achieved by using map-base braking.

In general, a decision-making model (such as an artificial intelligence model) can constantly sample the current world state to collect information like tire slip, wind speed, road surface, tire temperature, lateral G-force, etc. If a driver is using navigation, map information used for the map-based braking can include turns at intersections—otherwise only the information of the next turn in the road may be available. Classical dynamics models can determine if the vehicle will be able to complete the turn based on, for example, variables in the current world information, the distance to the next turn/position in the turn based on map information, the position of vehicle in relation to the turn, an angle and elevation change of the turn, etc. Braking can occur as needed so that the vehicle enters the turn at a speed that ensures that a safe and smooth trajectory is maintained that the driver can use to traverse the turn.

Map-based braking is discussed in more detail below after an initial description of a vehicle and environment with which the invention may be used.

Figure 1:
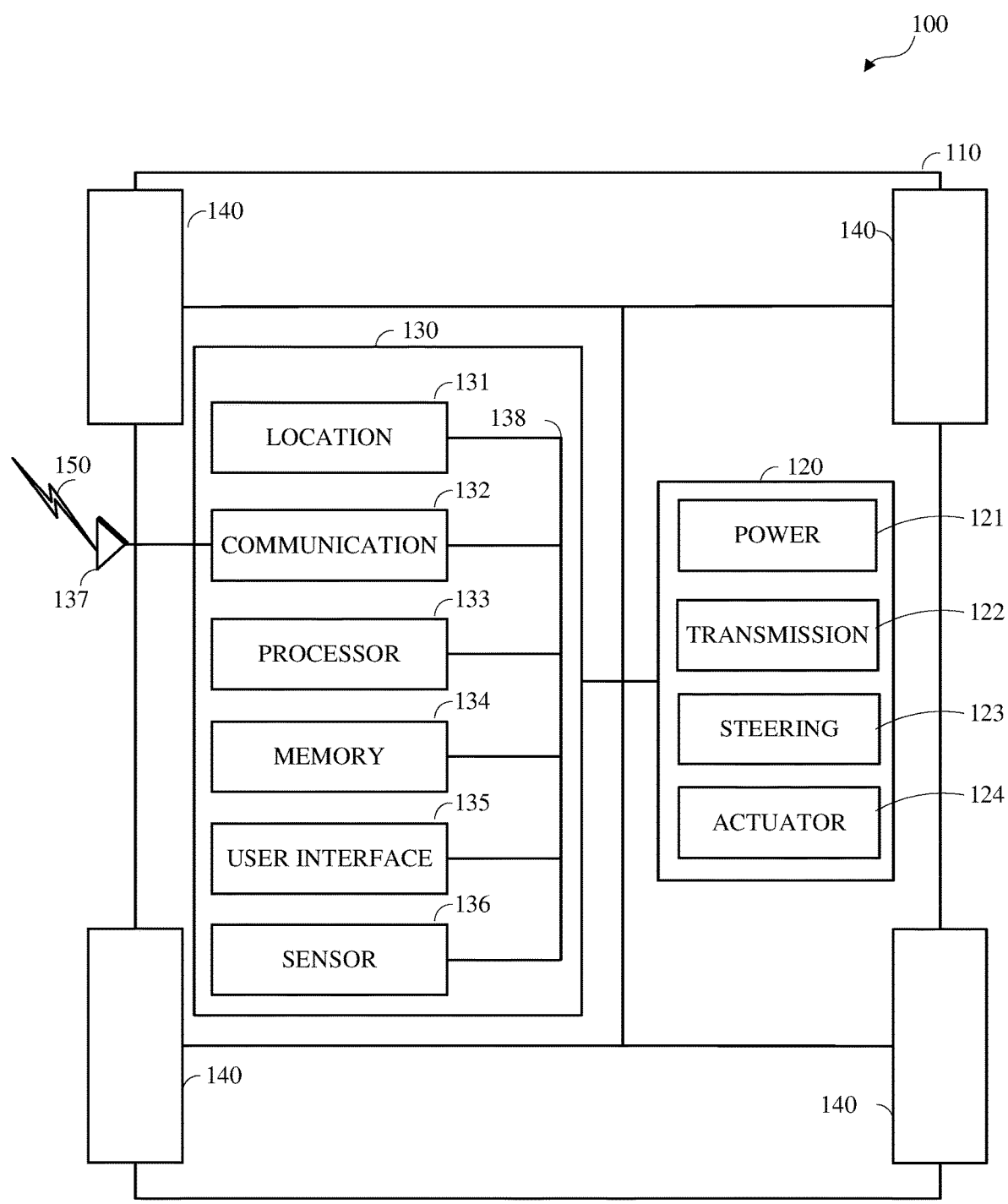
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a GPS unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

Figure 2:
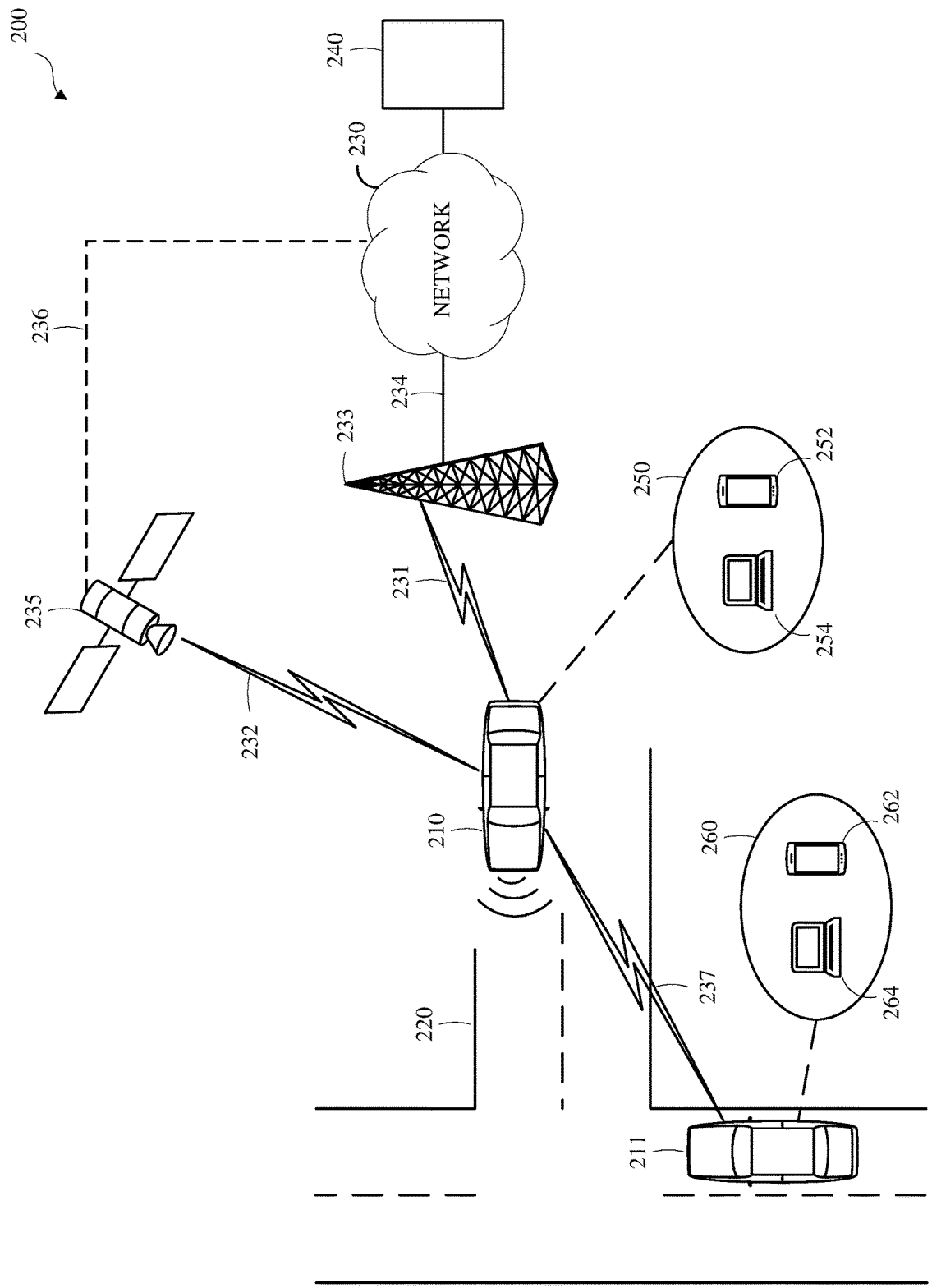
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and the vehicle may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231, 234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232, 236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250, 260, such as a driver, operator, or owner of the vehicle. In some embodiments, an entity 250, 260 associated with a vehicle 210/211 may be associated with one or more personal electronic devices, such as a smartphone 252, 262 or a computer 254, 264. In some embodiments, a personal electronic device may communicate with a corresponding vehicle 210/211 via a direct or indirect communication link. Although one entity 250, 260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
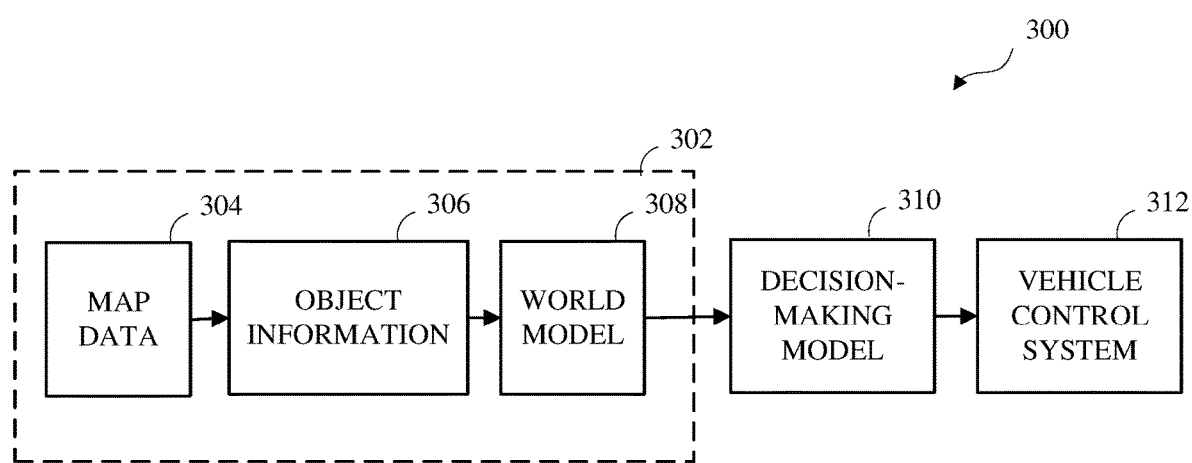
FIG. 3 is a diagram of a data pipeline for vehicle control using map-based braking according to the teachings herein.

FIG. 3 is a diagram of a data pipeline 300 for vehicle control using map-based braking according to the teachings herein. As shown, the data pipeline 300 includes a perception system 302, a decision-making model 310, and a vehicle control system 312. The perception system 302 may comprise map data 304, an object information module 306, and a world model 308. In some implementations, the perception system 302 receives the map data 304 as input such that a map is not part of the perception system 302.

The map data 304 comprises any map data representative of the operational environment about the vehicle, including the vehicle transportation network. The map data may be high-definition map data from a high-definition (HD) map. In general, HD maps are constructed using vehicles respectively equipped with high-end, 3D sensors, cameras, and a global positioning system (GPS) unit. The sensors create a detailed 3D map of the world, and the data is geotagged using highly accurate GPS units. The exact location of traffic sings, road edges, lane markings, etc., may be included. The map data 304 may be standard-definition map data from a standard-definition (SD) map. A SD map contains information at the topological level, where road feature locations are approximate, such as at one meter level of accuracy, and may exclude individual road lanes of an entire road. The disclosure herein may be used with a HD or a SD map, any other type of map, or a combination of such maps. Accordingly, the map data 304 may be HD map data, SD map data, or some combination of HD map data and SD map data. For example, some areas of the operational environment may be represented by HD map data, while others are represented by SD map data.

The object information module 306 can receive raw perception data from sensors of the vehicle, such as the sensor 136. The sensors 136 may be include a camera (e.g., an image camera), light detection and ranging (LiDAR), a GPS sensor or unit, or any other sensor or combination of sensors that images, captures, identifies, or otherwise detects the operational environment around the vehicle. The object information module 306 can receive data from other sources, such as from fixed infrastructure cameras, other vehicles within the vehicle transportation system, a remote vehicle support system, etc., through wired and wireless signal links described above with reference to FIG. 2. The object information module 306 can perform object association. For example, object association can include determining objects from the received signals. Object association may associate location information within each of the signals with a respective road object, e.g., a vehicle, a pedestrian or non-motorized vehicle, etc., within the vehicle transportation network. The object information module 306 may generate or maintain a state for at least some of the determined objects, such as a velocity (when an object is a dynamic object and not a static object), a pose, a geometry (such as width, height, and depth), a classification (e.g., bicycle, large truck, pedestrian, road sign, etc.), a lane location, or some combination thereof.

The world model 308 may be present, for example, when the vehicle is an AV. When present, the world model 308 can output object information, including separately tracked objects with a respective trajectory for use in decision making. The world model 408 can output localization information, e.g., the position of objects relative to roads and/or lanes in the vehicle transportation network. The world model 308 may receive the sensed objects over time from the object information module 306. Using data such as the location, and heading and velocity information where available, sensed objects may be fused where appropriate. That is, the data associated with each object may be compared to determine whether respective objects identified by separate sources (e.g., from separate signals input to the object information module 306) may be the same object. Any technique for comparing the data of each sensed object may be used. The more similar the data is, the more likely two objects are the same. The data of the objects determined to be the same object are fused to generate an object, including a tracked object at positions over time (e.g., a fused trajectory).

Although the perception system 302 is shown as a single component of the data pipeline 300, at least some components of the perception system 302 may be duplicated (e.g., because multiple scenarios are indicated by the detected objects). For example, a single world model 308, where present, may be used, while a respective object information module 306 (e.g., each associated with an object) may be used. Other variations are possible.

A decision-making model 310 may comprise a Partially Observable Markov Decision Process (POMDP) model, a Markov Decision Process (MDP) model, a Classical Planning (CP) model, a Partially Observable Stochastic Game (POSG) model, a Decentralized Partially Observable Markov Decision Process (Dec-POMDP) model, a Reinforcement Learning (RL) model, an artificial neural network, hardcoded expert logic, or any other suitable type of models. The decision-making model 310 receives inputs from the perception system 302 and outputs an instruction (e.g., a brake instruction according to map-based braking) to a vehicle control system 312. The decision-making model 310 can be part of, incorporated, integrated with, or otherwise be controlled by computer-executable instructions that define a manner by which the model 310 operates and/or a manner by which the model 310 is utilized, such as using a processor, such as the processor 133

Figure 4:
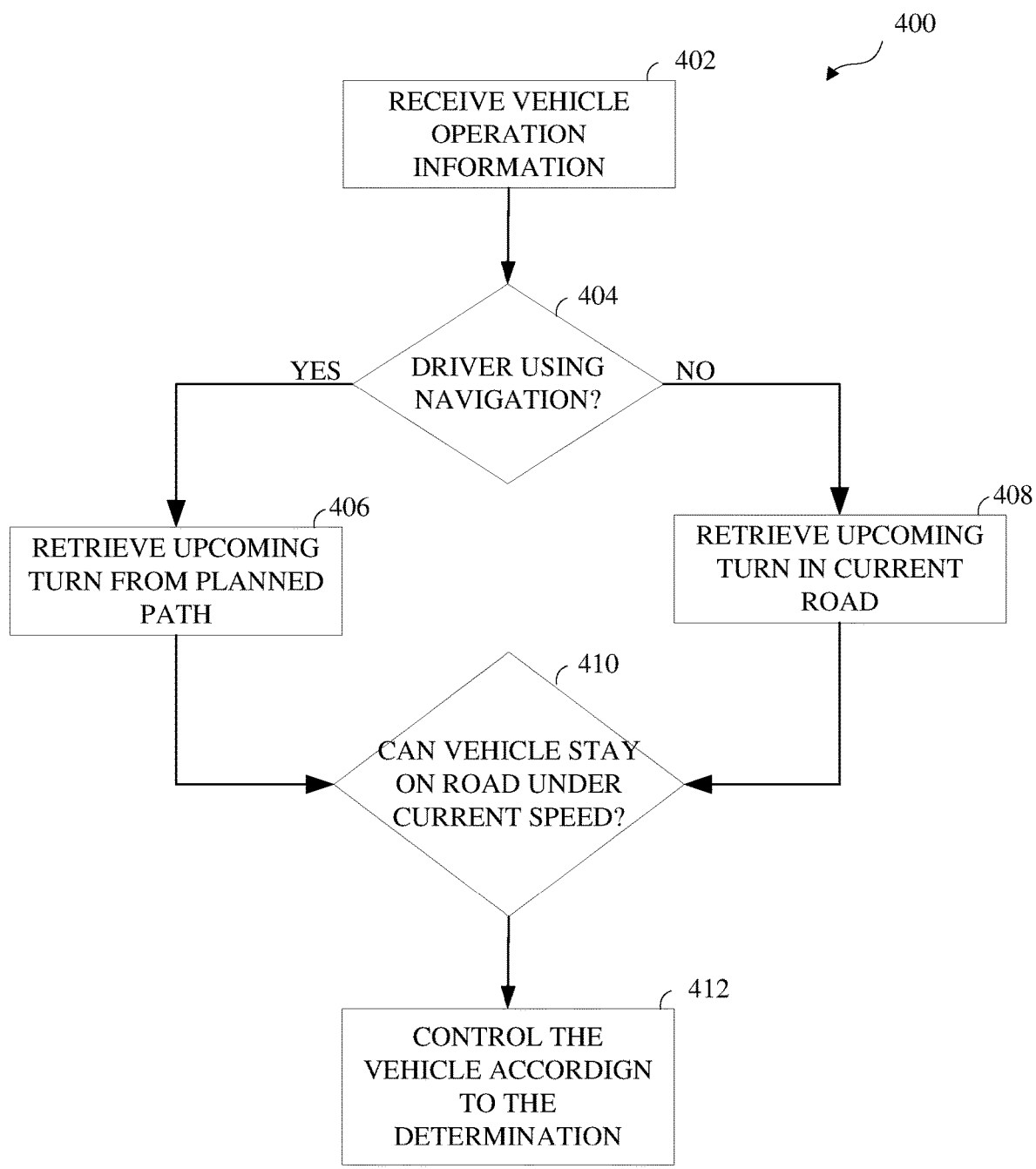
FIG. 4 is a flow chart of a method for vehicle control using map-based braking according to the teachings herein.

Further details of the decision-making model 310 and its interaction with one or more vehicle control systems, such as the vehicle control system 312, are next described with reference to FIG. 4, which is a flow chart of a method 400 for vehicle control using map-based braking, and FIG. 5, which is a diagram of a portion of a vehicle transportation network 500 used to describe the method 400 of FIG. 4.

The method 400 may be performed by a computer, processor, a controller, or any combination of hardware, with or without software. The method 400 may be performed by the vehicle, such as by the processor 133. The method 400 may be performed, at least in part, by the decision-making model 310. The method 400 may be a routine that is called as part of a main loop for vehicle control (e.g., joining other electronic systems like traction control). The method 400 may be repeated at defined intervals to determine if there are changes detected (e.g., each time the main loop runs).

At 402, vehicle operation information is received (produced, obtained, determined, etc.) while a driver is operating the vehicle to traverse a vehicle transportation network. A driver is operating the vehicle, for example, when the vehicle, in an AV, is operating in a non-autonomous mode. A driver is operating the vehicle, for example, when at least a portion of the vehicle control (e.g., steering, braking, accelerating, signaling, etc.) is being performed manually. A driver may be operating a vehicle even if an ADAS or other assisted driving technology is enabled.

The vehicle operation information may be obtained from the perception system 302. The vehicle operation information includes at least a current speed of the vehicle, such as from a sensor 136. Less desirably, but possibly, the current speed may be received from an external source, such as from a device, unit, or element of the vehicle transportation and communication system 200. Other vehicle operation information may be used in the map-based braking herein. For example, the sensor 136 may include a temperature sensor for determining a temperature of at least one of the wheels, such as a wheel 140, a tire pressure sensor for determining a tire pressure of at least one of the wheels, a torque sensor and a wheel rotation sensor for determining a wheel slip of at least one of the wheels, a strut compression sensor for determining a loaded weight of the vehicle, or any combination thereof. The temperature, the tire pressure, the wheel slip, and the loaded weight may be considered vehicle operation information when present. Current autonomous driving does not account for these variables in trajectory planning because an AV does not try to push the limits of a car's capability like a driver does when manually operating a vehicle. These additional sensors may be useful in such closer to the edge driving by providing information that demonstrates a need for more heavy braking for an upcoming turn than would be expected in the absence of this information.

The vehicle operation information is not limited to data regarding the vehicle itself. The vehicle operation information may include operational environment data that comprises data associated with objects and/or the environment external to the vehicle. Objects external of the vehicle may be static objects, dynamic objects, pedestrians, remote vehicles, vehicle transportation network geometry, etc., or combinations thereof. In some implementations, the operational environment data may be produced by a perception system, such as the perception system 302. The operational environment data may correspond to information received from raw perception data or produced using the raw perception data. For example, the operational environment data may be or include raw perception such corresponding to that received by the object information module 306 and/or produced by the world model 308 described above.

In some implementations, the operational environment data may be obtained using one or more image sensors. For example, the sensor 136 may include an image sensor that captures images of the surface (e.g., of a road) upon which the vehicle is traveling. Using image recognition techniques, the quality of the surface and/or objects or debris on the surface (e.g., water, leaves, etc.) may be identified for use in the method 400.

The vehicle operation information is not limited to data obtained while the vehicle is traversing a vehicle transportation network. Some vehicle operation information may be available before the start of travel. For example, tire wear of one or more of the wheels may be known. Weather, wind speed, and/or external temperature may be known ahead of time or may be determined while the vehicle is traveling, e.g., from manual input or from an on-board system.

At 404, a determination may be made as to whether the driver is using an in-vehicle navigation system. The next step in the method 400 to retrieve an upcoming turn may be responsive to this query. That is, when the driver is using the in-vehicle navigation system, an upcoming turn in the current road on which the vehicle is traveling may be retrieved from a planned path of the in-vehicle navigation system at 406. Alternatively, when the driver is not using the in-vehicle navigation system (or an in-vehicle navigation system does not exist), an upcoming turn in the current road may be retrieved from map data, such as the map data 304, at 408.

The planned path can include map data from the in-vehicle navigation system that includes the upcoming turn. The map data retrieved when the driver is not using an in-vehicle navigation system may be map data from the in-vehicle navigation system, when present, even if the system is not being used. The map data may be retrieved from stored data, such as map data stored on a removable disk, such as in memory 134, or map data may be retrieved from an external source through wireless communications, such as through the electronic communication interface 137.

In some implementations, the upcoming turn retrieved from the planned path is the same as the upcoming turn received from the map data. In some implementations, the upcoming turn retrieved from the planned path is different from the upcoming turn received from the map data. This can be explained with reference to the portion of the vehicle transportation network 500 in FIG. 5.

Figure 5:
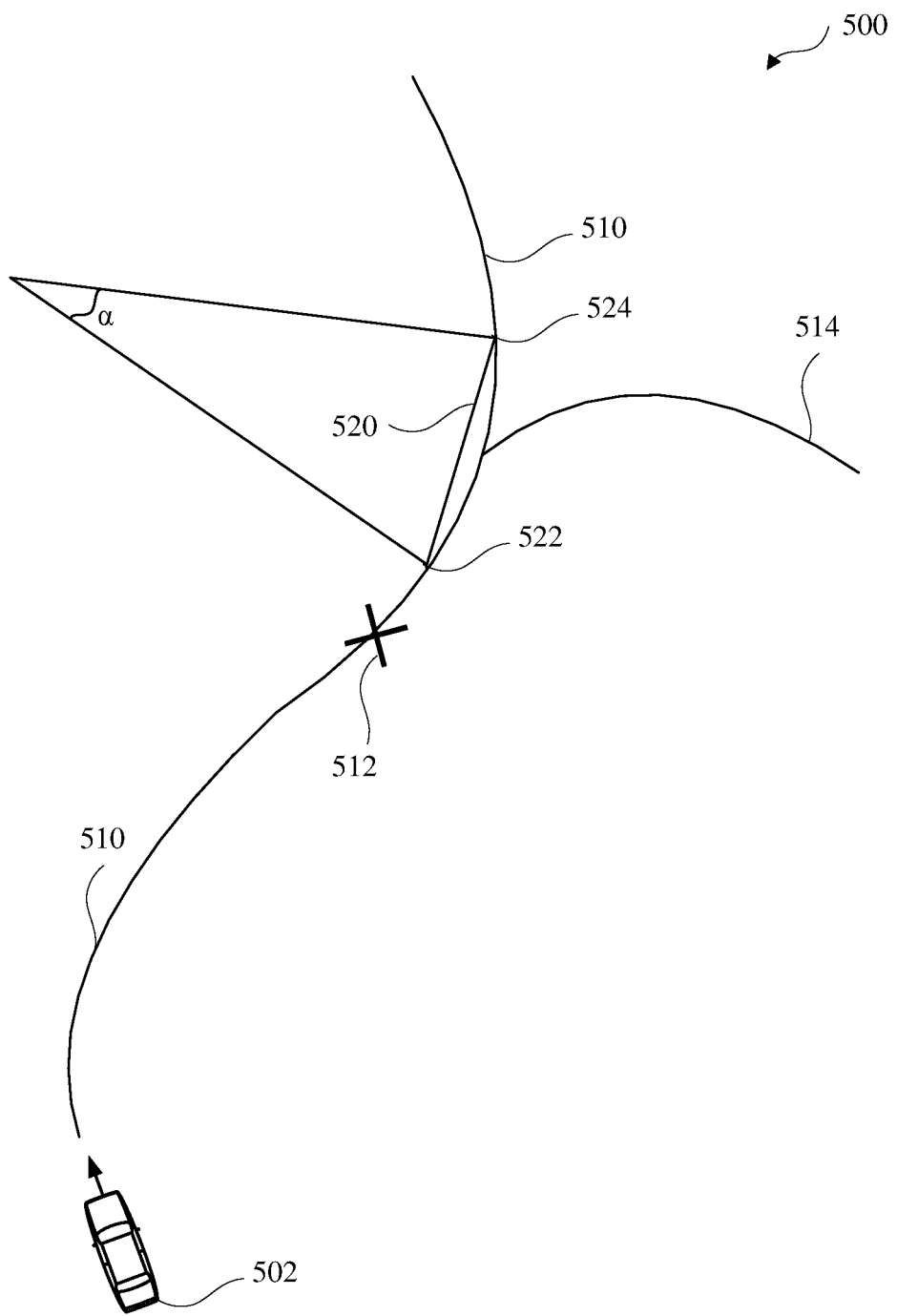
FIG. 5 is a diagram of a portion of a vehicle transportation network used to describe the method of FIG. 4.

In FIG. 5, a vehicle 502 is traveling along a current road 510 within the portion of the vehicle transportation network 500. As it exits the turn (e.g., the right curve) in the current road 510 at or near X 512, the vehicle 502 may continue its travel along the current road 510, which now includes an upcoming turn to the left, or may take the upcoming turn to the right onto the road 514. If the driver of the vehicle 502 is using the in-vehicle navigation system, the upcoming turn retrieved from the planned path at 406 may be either the turn that maintains the vehicle 502 on the current road 510 or the turn that moves the vehicle 502 to the road 514. Stated more generally, to retrieve, from the planned path of the in-vehicle navigation system, the upcoming turn when the driver is using the in-vehicle navigation system can include obtaining, from a map of the in-vehicle navigation system, data regarding a curve in the current road, such as the current road 510, that causes the vehicle to advance along a new road, such as the road 514, different from the current road.

In contrast, if the driver of the vehicle 502 is not using the in-vehicle navigation system, a default rule may be that the upcoming turn retrieved from the map data at 408 is the turn that maintains the path on the current road 510. Stated otherwise, to retrieve, from the map data, the upcoming turn in the current road when the driver is not using in-vehicle navigation can include obtaining data regarding a curve in the current road that maintains a current path of the vehicle along the current road, such as the current road 510. Other default rules are possible where a driver is not using an in-vehicle navigation system.

Once the upcoming turn is retrieved at either 406 or 408, the method 400 queries at 410 whether the vehicle will stay on the road under the current speed. For example, the method 400 may determine whether, during the upcoming turn, wheels of the vehicle will maintain contact with a road surface at the current speed. More than one test is possible to determine whether the wheels of the vehicle will maintain contact with the road surface at the current speed. For example, if the dynamics of the vehicle motion at the current speed are such that at least one of the wheels will lift off the road surface based on (e.g., the geometry of) the upcoming turn, or go outside of the boundaries of the lane or road during the upcoming turn, the method 400 can conclude that the vehicle will not stay on the road at the current speed. For example, if the dynamics of the vehicle motion at the current speed are such that at least one of the wheels will experience slip while the vehicle traverses the upcoming curve without reduction in speed, the method 400 can conclude that the vehicle will not stay on the road at the current speed. In some implementations, a maximum acceptable amount of slip to maintain contact with the road surface may be determined, and the method determines whether the vehicle will maintain contact with the road surface at the current speed with less than or equal to the maximum acceptable amount of slip while the vehicle traverses an upcoming curve. This may define a safety margin between no slip and slipping off the road entirely.

Retrieving the upcoming curve at 406 or 408 may include or prompt determining the geometry of the upcoming curve for use in the determination at 410. For example, the geometry of the upcoming curve may include the start point of the upcoming curve. The start point of the upcoming curve may be where a vehicle traveling along a straight path will not stay on the road if its front and rear wheel remain aligned (e.g., steering must occur to stay on the road). The start point of the upcoming curve may be where a vehicle traveling along a curve will be required to align its front and rear wheels in preparation to enter the upcoming curve that is in the opposite direction from the current curve—i.e., the vehicle is switching from a left curve to a right curve or from a right curve to a left curve). The geometry of the upcoming curve may include an end point of the upcoming curve. The end point of the upcoming curve may be where a vehicle traveling along the upcoming curve will be required to align its front and rear wheels (e.g., steering must occur in the opposite direction from the curve to stay on the road). As this description makes clear, the end point of one upcoming curve may be the start point of another upcoming curve (see, e.g., point 512 in FIG. 5). The geometry of the upcoming curve may include the length of the curve or other indicia.

The elevation change of the upcoming turn may also be used as input to determine whether the wheels of the vehicle will maintain contact with the road surface at the current speed at 410. The elevation change may be determined from operational environment data and/or the map data described with regards to the vehicle operation information at 402 and/or the perception system 302. The elevation change may be determined from information, such as a from a topographic map, wirelessly received from an external data source or locally stored similarly to the map data 304. The elevation change may be considered as part of the geometry of the upcoming curve.

In some implementations, the geometry includes the degree of curvature, and the degree of curvature of the upcoming turn is determined. Then, determining whether the wheels of the vehicle will maintain contact with the road surface at the current speed at 410 can include using the degree of curvature as input. Referring again to FIG. 5, one example of determining the degree of curvature of the upcoming turn is shown by example. A chord is defined by two points located along the upcoming turn, and a central angle is determined based on a length of the chord. In FIG. 5, a chord 520 is defined by the two points 522 and 524. The central angle α is determined based on the length of the chord 520 using conventional geometry. The central angle α is the degree of curvature.

In the example of FIG. 5, neither of the two points are at the start point or end point of a curve. The two points can be at the start point and the end point of a curve. However, if the degree of curvature changes along the length of the curve, such as it does for the curve of the road 514, it may be more desirable to determine multiple values for the degree of curvature over the length of the upcoming curve and use the value indicating the tightest curve as input. In the example described above, multiple chords (e.g., of the same length) may be used to determine respective values for the central angle α to determine the tightest curve of the upcoming turn. Other variations are possible.

As described above, the vehicle operation information used in the determination at 410 can include data related to the vehicle such as tire wear of at least one of the wheels of the vehicle, a tire temperature of at least one of the wheels, a tire pressure of at least one of the wheels, a wheel slip of at least one of the wheels, a loaded weight of the vehicle, or any combination thereof. In these implementations, determining whether the wheels of the vehicle will maintain contact with the road surface at the current speed at 410 can use one or more of these values as input.

In some implementations, determining whether the wheels of the vehicle will maintain contact with the road surface at the current speed at 410 can include using operational environment data such as described above with regards to the vehicle operation information at 402 and/or the perception system 302 as input. For example, surface quality of the road surface can affect whether a wheel will maintain contact with the road surface at the current speed. For example, debris detected and identified by one or more image sensors can affect whether a wheel will maintain contact with the road surface at the current speed.

The vehicle will be controlled at 412 according to the determination at 410 using one or more control systems of the vehicle. A braking instruction may be issued at 412 to a control system responsive to whether the wheels of the vehicle will maintain contact with the road surface at the current speed at 410. For example, the decision-making model 310 may use the current speed, the upcoming turn, and optionally other information from the perception system 302 to issue a braking instruction at 412. The control system can be or include any ADAS system. The control system can be or include a four-wheel independent braking system, a traction/stability control system, or both.

The inputs to the decision-making model 310 used to determine whether the vehicle can stay on the road under the current speed at 410 can also be used to determine values for controlling the vehicle at 412. For example, operational environment information like surface quality and/or debris on a road surface may affect how quickly a vehicle can decelerate. Hence, they may be used in determining a braking instruction.

The braking instruction issued to the control system at 412 can include to leave a current braking level unchanged (e.g., maintaining the current speed) when the wheels of the vehicle will maintain contact with the road surface at the current speed. A braking instruction can be issued at 412 that slows the vehicle to a target speed that will allow the wheels of the vehicle to maintain contact with the road surface through the upcoming turn when the determination at 410 concludes that the wheels of the vehicle will not maintain contact with the road surface at the current speed.

Determining whether the vehicle can stay on the road at the current speed at 410 can also include determining what a target speed should be when the current speed is too high. Accordingly, issuing the braking instruction to a control system to control the vehicle at 412 can include transmitting the target speed to the control system for the control system to control the brakes to reach the target speed. As noted above, the control system can include more than one control system. For example, the braking instruction can include an instruction to end acceleration (when the driver is accelerating the vehicle such that the speed is increasing) and an instruction to slow the vehicle to the target speed below the current speed when the wheels of the vehicle will not maintain contact with the road surface at the current speed. The distance until the upcoming turn may be measured, and the rate of braking could be calculated to smoothly brake the needed amount before entering the turn.

When determining the braking instruction, an optional goal may be to issue an instruction that causes a traction/stability control system to maintain balance of the vehicle while slowing the vehicle. In some implementations, the braking instruction may be an instruction to perform four-wheel independent braking to maintain balance of the vehicle while slowing the vehicle. Four-wheel independent braking is particularly useful to maintain the dynamics of the vehicle (e.g., in conjunction with torque sensors of the traction/stability control system) where the vehicle is already in the beginning of the turn (or will be making multi-turn moves). Map-based braking may apply more braking to the vehicle using rear brakes of the vehicle than using front brakes of the vehicle under some circumstances. Using the rear brakes more heavily can slow the vehicle without shifting its weight forward, for example.

Map-based braking as described herein can look ahead for multiple turns for things like decreasing radius turns or multi-turns in the road so that the exit angle and speed of the vehicle from one turn will continue safely into the next turn. If the system determines a need to brake, the system can remove acceleration at multiple wheels (e.g., for multi-motor electric vehicles) and institute individual wheel braking to not upset the balance and stance of the vehicle.

If there is a fork in the road ahead and only one way has a hard turn, map-based braking can institute an extra level of safety by slowing at the fork knowing that if the path is chosen with the hard turn, then the vehicle will at a low enough speed.

In some implementations, map-based braking may be turned on and off. In a variation of the teachings above, the instruction issued at 412 for vehicle control may be operated at different levels of caution. For example, a basic setting may be for an inexperienced driver that results in the vehicle entering an upcoming turn at a speed and angle that keeps the vehicle below the grip limit through the turn. A track mode may result in a vehicle entering an upcoming turn at the grip limit of a wheel. For example, the braking instruction may be based on a maximum allowable speed that will maintain contact of the wheels of the vehicle with the road surface (e.g., the target speed is the maximum allowable speed) in a track mode, while the braking instruction may be based on a percentage of the maximum allowable speed (e.g., 80% of the maximum allowable speed) in daily driving or with an inexperienced driver, that is, the target speed is lower than the maximum allowable speed.

According to the teachings herein, an improvement to vehicle operation may be made over existing techniques implementing braking as part of ADAS. For example, the map-based braking described herein may allow for a better response to tight turns as compared to object detection-based predictive braking alone because in the latter technique the braking distance may be short when a wall or mountain is detected. The use of maps, elevation changes, etc., provides additional assistance to drivers. The flexible approach herein can incorporate weather/road surface in speed planning for further improvements over existing techniques, especially where the vehicle is at the edge of tire traction. The map-based braking provides the ability to take over from the driver to brake using on information that has not yet been detected by the driver.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An apparatus for vehicle control, the apparatus comprising:
 a processor configured to:
  receive, while a driver is operating the vehicle to traverse a vehicle transportation network, vehicle operation information including at least a current speed of the vehicle;
  retrieve, from a planned path of an in-vehicle navigation system, an upcoming turn in a current road when the driver is using the in-vehicle navigation system, wherein the upcoming turn in the current road comprises data regarding a curve in the current road that causes the vehicle to advance along a new road different from the current road;

retrieve, from map data, the upcoming turn in the current road when the driver is not using the in-vehicle navigation system;

determine whether, during the upcoming turn, wheels of the vehicle will maintain contact with a road surface at the current speed; and issue a braking instruction to a control system of the vehicle responsive to whether the wheels of the vehicle will maintain contact with the road surface at the current speed.

2. The apparatus of claim 1, wherein the processor is configured to:

determine a degree of curvature of the upcoming turn; and determine whether the wheels of the vehicle will maintain contact with the road surface at the current speed using the degree of curvature as input.

3. The apparatus of claim 2, wherein to determine the degree of curvature of the upcoming turn comprises to:

determine a chord defined by two points located along the upcoming turn; and determine a central angle based on a length of the chord, wherein the central angle is the degree of curvature.

4. The apparatus of claim 1, wherein to retrieve, from the map data, the upcoming turn in the current road when the driver is not using in-vehicle navigation comprises to obtain data regarding a curve in the current road that maintains a current path of the vehicle along the current road.

5. The apparatus of claim 1, wherein the processor is configured to:

receive, while the driver is operating the vehicle to traverse the vehicle transportation network, operational environment data, wherein the operational environment data includes data associated with objects external to the vehicle; and determine whether the wheels of the vehicle will maintain contact with the road surface at the current speed using the operational environment data as input.

6. The apparatus of claim 5, wherein the operational environment data comprises at least one of surface quality of the road surface or debris on the road surface.

7. The apparatus of claim 1, wherein the processor is configured to:

determine an elevation change of the upcoming turn; and determine whether the wheels of the vehicle will maintain contact with the road surface at the current speed using the elevation change as input.

8. The apparatus of claim 1, wherein:

the vehicle operation information comprises tire wear of at least one of the wheels of the vehicle; and the processor is configured to determine whether the wheels of the vehicle will maintain contact with the road surface at the current speed using the tire wear as input.

9. The apparatus of claim 1, wherein:

the vehicle operation information comprises at least one of a tire temperature of at least one of the wheels, a tire pressure of at least one of the wheels, a wheel slip of at least one of the wheels, or a loaded weight of the vehicle; and to determine whether the wheels of the vehicle will maintain contact with the road surface at the current speed uses the at least one of the tire temperature, the tire pressure, the wheel slip, or the loaded weight.

10. The apparatus of claim 1, wherein the map data comprises high-definition map data, standard-definition map data, or a combination of high-definition map data and standard-definition map data of the in-vehicle navigation system.

11. The apparatus of claim 1, wherein to issue the braking instruction to the control system comprises to end acceleration and slow the vehicle to a target speed below the current speed when the wheels of the vehicle will not maintain contact with the road surface at the current speed.

12. The apparatus of claim 1, where to determine whether the wheels of the vehicle will maintain contact with the road surface at the current speed comprises to:

determine a maximum acceptable amount of slip to maintain contact with the road surface; and determine whether the vehicle will maintain contact with the road surface at the current speed with less than or equal to the maximum acceptable amount of slip while the vehicle traverses the upcoming curve.

13. The apparatus of claim 1, wherein to issue the braking instruction to the control system comprises to issue an instruction to a traction/stability control system to maintain balance of the vehicle while slowing the vehicle.

14. The apparatus of claim 1, wherein to issue the braking instruction to the control system comprises to issue an instruction to perform four-wheel independent braking to maintain balance of the vehicle while slowing the vehicle.

15. The apparatus of claim 1, wherein to issue the braking instruction to the control system comprises to issue an instruction to apply more braking to the vehicle using rear brakes of the vehicle than using front brakes of the vehicle.

16. The apparatus of claim 1, wherein to issue the braking instruction to the control system comprises to issue an instruction to leave a current braking level unchanged.

17. A vehicle implementing vehicle control, comprising:
an in-vehicle navigation system;
a control system for braking the vehicle; and
a processor configured to:

receive, while a driver is operating the vehicle to traverse a vehicle transportation network, vehicle operation information including at least a current speed of the vehicle;

determine whether the driver is using the in-vehicle navigation system;

retrieve, from a planned path of the in-vehicle navigation system, an upcoming turn in a current road when the driver is using the in-vehicle navigation system, wherein the upcoming turn in the current road comprises data regarding a curve in the current road that causes the vehicle to advance along a new road different from the current road;

retrieve, from map data, the upcoming turn in the current road when the driver is not using the in-vehicle navigation system;

determine whether, during the upcoming turn, wheels of the vehicle will maintain contact with a road surface at the current speed; and issue a braking instruction to the control system responsive to whether the wheels of the vehicle will maintain contact with the road surface at the current speed.

18. The vehicle of claim 17, wherein the control system comprises at least one of a four-wheel independent braking system or a traction/stability control system.

19. The vehicle of claim 17, comprising at least one of:
a temperature sensor for determining a temperature of at least one of the wheels;
a tire pressure sensor for determining a tire pressure of at least one of the wheels;

a torque sensor and a wheel rotation sensor for determining a wheel slip of at least one of the wheels; or a strut compression sensor for determining a loaded weight of the vehicle, and wherein a level of braking provided by the braking instruction is based on at least one of the temperature, the tire pressure, the wheel slip, or the loaded weight.

20. The vehicle of claim 17, wherein the braking instruction to the control system comprises to leave a current braking level unchanged.

* * * * *